United States Patent

Persiani

[11] Patent Number: 5,114,197
[45] Date of Patent: May 19, 1992

[54] MECHANISM DESIGNED TO ENSURE THAT ACTUATORS FOR AUTOMATICALLY LOCKING AND UNLOCKING AUTOMOBILE DOORS HAVE NO LOAD AT THE END OF THEIR MOVEMENT RUN

[75] Inventor: Luigi Persiani, Osimo, Italy

[73] Assignee: SO.GE.MI. - S.P.A., Osimo, Italy

[21] Appl. No.: 684,241

[22] Filed: Apr. 12, 1991

[30] Foreign Application Priority Data

Apr. 13, 1990 [IT] Italy ................... 618 A/90

[51] Int. Cl.⁵ ............................................. E05B 53/00
[52] U.S. Cl. ................... 292/336.3; 74/89.17; 74/530; 74/625; 292/201
[58] Field of Search ............ 292/336.3, 144, 201, 292/142, 172; 74/89.17, 530, 625

[56] References Cited

U.S. PATENT DOCUMENTS

| | | | |
|---|---|---|---|
| 4,616,527 | 10/1986 | Frey et al. | 74/625 |
| 4,706,512 | 11/1987 | McKernon et al. | 74/625 X |
| 4,739,677 | 4/1988 | Kofink et al. | 292/336.3 X |
| 4,921,288 | 5/1990 | Cifuentes et al. | 292/336.3 X |
| 4,941,694 | 7/1990 | Bartel et al. | 292/336.3 X |
| 5,040,390 | 8/1991 | Mistry et al. | 292/336.3 X |

Primary Examiner—Richard E. Moore
Attorney, Agent, or Firm—Leonard Bloom

[57] ABSTRACT

A mechanism designed to ensure that actuators used for automatically locking and unlocking automobile doors have no load at the end of their movement run.

In this invention, the rack that is moved in order to lock or unlock the door in question, permanently engages with a pinion moulded in a single piece with a circular cup whose rim has a section that is detached from the base plate and has an internal prong at its end, so that it is able to move outwards under pressure from a wedge that projects radially from a drive gear and engages and rotates the aforementioned prong.

2 Claims, 1 Drawing Sheet

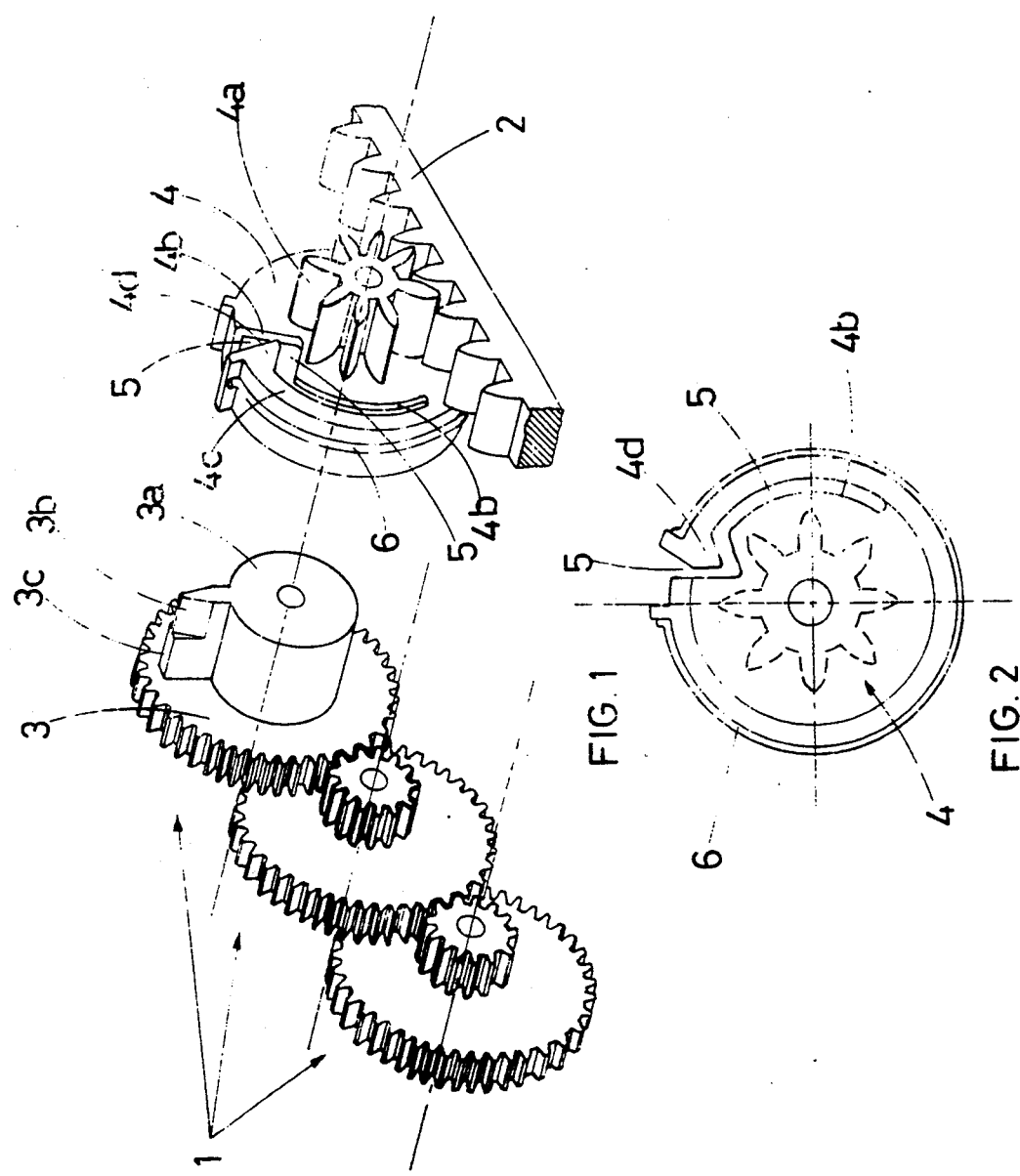

MECHANISM DESIGNED TO ENSURE THAT ACTUATORS FOR AUTOMATICALLY LOCKING AND UNLOCKING AUTOMOBILE DOORS HAVE NO LOAD AT THE END OF THEIR MOVEMENT RUN

The object of the present industrial patent application is a mechanism designed to ensure that actuators used for automatically locking and unlocking automobile doors have no load at the end of their movement run.

As everyone knows, nowadays the vast majority of cars have automatic centralized door-locking systems, which use actuators that are capable of simultaneously locking or unlocking all the door-locks on a car, as well as that of the boot and the panel giving access to the fuel tank filler cap.

These devices, particularly those installed on doors, must for safety reasons be manually operable from the interior of the vehicle, so that passengers can lock or release the door-locks if the automatic system should break down.

In consideration of the above, most automobile manufacturers use a manual control rod used to manually lock or unlock the door in question, which, each time it reaches one of the two positions at the limit of its movement, is automatically disconnected from the motorized forward or reverse movement actuator.

This automatic uncoupling of the rod and its drive mechanism is particular to so called "zero-load" actuators, which are characterized by the fact that their drive mechanism offers no resistance to movement of the manual control rod.

Currently used zero-load actuators generally consist of a gear train, the last gear of which diametrically supports a moving slide with a triangular shaped prong at its end that fits into and moves with a similarly shaped wedge on the outer rim of a plate connected to the pinion gear that engages with a rack on the control rod.

When the last gear in the train rotates, the prong on the slide fitted to it engages with the aforementioned wedge on the plate rim, and rotates its support plate, which, via the pinion gear connected to it, transmits motion to the rack and thus the control rod.

When the control rod reaches one of the its rest points at either end of its movement run, the rack, pinion gear permanently engaged with it, and the plate and wedge can no longer move, although the prong continues to press against the wedge.

This pressure causes the prong to lift, as permitted by the diametric movement of the aforementioned slide, over the wedge against the pressure of a return spring.

This lifting movement thus automatically disengages the gear train from the control rod, which is then free to move and encounters no resistance as the pinion gear engaging with the rack on the rod is now free to rotate for approximately 360 degrees, until the aforementioned wedge once again strikes against the prong on the aforementioned slide.

The object of the present invention is that of designing a new mechanism capable of ensuring a "zero-load" on the aforementioned actuators, that is cheaper to manufacture than those known in the art and described above, because it contains fewer moving parts and is easier to assemble.

In the mechanism according to the invention, the pinion gear that engages with the rack on the control rod is a single piece of moulded plastic with a circular cup forming one end of the pinion whose diameter is larger that of the pinion.

There is a cut in the rim of this cup which extends in an arc along the flat base part of the aforementioned cup for approximately one quarter of the circumference of the cup, and isolates a section of the circular perimeter of the aforementioned cup rim, whose free end has an internally facing wedge shaped prong.

The hub of the last gear wheel in the reduction gear train is housed in a perfectly central position inside the cup, and this hub has a wedge shaped projection lengthwise across its outer rim which presses against the aforementioned prong and thus rotates the pinion gear thereby moving the rack on the control rod.

When the control rod reaches one of its movement limits, the pinion gear engaging with it is forced to stop, and the aforementioned prong becomes a fixed buffer stop which prevents the wedge on the hub that engages with it from rotating.

However, when this occurs, the pressure exerted by the wedge on the hub is sufficient to cause the aforementioned isolated section of the perimeter of the cup rim to bend with an elastic movement away from the hub thereby lifting the prong over the wedge shaped projection, thus ensuring that there is a "zero-load" on the control rod, if and when it is manually moved.

For greater clarity, the description of the invention that follows makes reference to the attached sheet of drawings, which is solely to illustrate and is not limiting, in which:

FIG. 1 is an exploded schematic drawing of the various parts of the mechanism according to the invention, shown axonometrically.

FIG. 2 is a plan view of the aforementioned pinion gear, shown separately.

With reference to FIG. 1, the mechanism according to the invention includes a conventional gear train (1) which reduces the number of rotations of the electric motor used to automatically drive the rack (2) that locks and unlocks the door-lock.

The last gear (3) in the gear train has a hub (3a) half the length of which is housed in a circular cup (4) that forms a single moulded piece with the pinion (4a) that engages with the rack (2).

In particular, the circular rim of the cup (4) has a cut (5) that extends along the edge of the base (4b) of the cup just beneath the part of the base that forms the edge of the circular rim, thus completely detaching the rim from the base (4b) for an arc of around a quarter of the circumference of the cup.

This detached section of rim (4c) has an internal wedge shaped prong (4d) on its free end which engages with and is driven by a similarly shaped wedge (3b) that projects from the rim of the hub (3a) on the last gear (3) in the train.

As can be clearly seen from the above description and attached sheet of drawings, the gear train (1), and in particular the last gear (3), rotates the pinion (4a) which engages with the rack (2) through the effect of the drive wedge (3b) pressing against the transmission prong (4d).

It can also be seen that, when the rack (2) reaches the end of its run and the transmission prong (4d) can no longer rotate, the drive wedge (3b) can force its way beneath and lift the transmission prong (4d) which bends in an elastic fashion towards the exterior of the cup rim (4c).

It should be pointed out that the open ring (6) fitted to the circular rim of the cup (4) has the task of countering the free movement of the section of rim (4c) for the entire time that the drive wedge (3b) is pressing against the prong (4d) and causing it to rotate.

Once the wedge has forced its way beneath the prong, there is clearly nothing resisting any manual movement of the rack (2), as the pinion (4a) is free to rotate for approximately 360 degrees until the prong (4d) hits the motor drive-wedge (3b).

Lastly, it should be pointed out, that immediately the wedge has forced its way beneath the prong, there is a radial tongue (3c) aligned with and just behind the wedge (3b) on the gear hub, that strikes against a buffer thus stopping the motor.

I claim:

1. Mechanism designed to ensure that, at the limit of their movement run, there is no load on the automatic door locking and unlocking actuators on automobiles, of the type that includes a gear train (1) that drives a rack (2) which requires moving in order to lock or unlock the door, characterized by the fact that the rack (2) engages with a pinion (4a) moulded in a single piece with a circular cup (4) in whose centre a hub (3a) is housed and rotates, this hub (3a) being connected to the last gear (3) in the gear train (1); a section (4c) of the circular rim of the cup (4) is detached from the base of the cup (4b) by a specially shaped cut (5), and its free end has an internal wedge shaped prong (4d) that engages with and is rotated by a similarly shaped wedge (3b) that projects radially from the external surface of the hub (3a) on the last gear wheel (3); there is also an open steel ring (6) that presses against the circular rim of the cup (4) and holds the rim in position.

2. Mechanism designed to ensure that, at the limit of their movement run, there is no load on the automatic door locking and unlocking actuators on automobiles, as per the previous claim, characterized by the fact that there is a radial tongue (3c) aligned with and just behind the wedge (3b) on the gear hub (3a), that strikes against a buffer thus stopping the motor once the wedge (3b) has forced its way beneath the prong (4d).

* * * * *